United States Patent [19]
Bridges

[11] Patent Number: 5,133,216
[45] Date of Patent: Jul. 28, 1992

[54] MANIPULATOR INTEGRAL FORCE SENSOR

[76] Inventor: Robert H. Bridges, 28586 La Cumbre, Laguna Niguel, Calif. 92677

[21] Appl. No.: 614,099

[22] Filed: Nov. 14, 1990

[51] Int. Cl.$^5$ .............................................. G01L 3/02
[52] U.S. Cl. .............................. 73/862.33; 73/862.19
[58] Field of Search .......... 73/862.32, 862.33, 862.04, 73/862.19, 862.35; 901/46, 34; 414/5; 623/57; 464/92, 89; 403/79, 161

[56] References Cited

U.S. PATENT DOCUMENTS

| | | | |
|---|---|---|---|
| 3,949,280 | 4/1976 | Odagivi et al. | 317/253 |
| 4,535,405 | 8/1985 | Hill et al. | 364/400 |
| 4,600,357 | 7/1986 | Coules | 414/730 |
| 4,666,361 | 5/1987 | Kitabatake et al. | 414/680 |
| 4,727,996 | 3/1988 | Fenn et al. | 212/213 |
| 4,838,361 | 6/1989 | O'Toole | 173/12 |
| 4,865,376 | 9/1989 | Leaver et al. | 294/111 |
| 4,866,993 | 9/1989 | Schumacker | 73/862.3 |
| 5,031,455 | 7/1991 | Cline | 73/862.34 X |

OTHER PUBLICATIONS

Guinot et al., Robotics Research 1986, "Modelization and Simulation of Force-Position Control for a Manipulator Gripper", p. 318.
Kato et al., Mechanical Hands Illustrated, 1987 Revised Edition, "Hand with Three Fingers", p. 56.
Leaveor et al., International Symposium on Robotics and Manufacturing 1988, "The Design of a Robot Finger For Tactile Sensing", p. 652.
Oomichi et al., Robotics Research 1988, "Mechanics and Multiple Sensory Bilateral Control of a Fingered Manipulator", p. 149.
Tanie, International Encyclopedia of Robots, 1988, "Grippers", p. 609.
Palm, International Encyclopedia of Robots, 1988, "Hands", pp. 627 and 628.
Melchiorri et al., World Conference on Robotics Research 1989, "An Interactive Environment for Planning, Simulation and Evaluation of Tasks for an Articulated Robotic Hand", pp. 6–80.
Bekey et al., Dextruns Robot Hands Springer-Verlag, 1990, "Control Architecture for the Belgrade/USC Hand", p. 142.
McCammon et al., Extrons Robot Hands, Springer-Verlag, 1990, "The Utah/MIT Dextrous Hand", p. 242.
Salisbury, Robot Hands and the Mechanics of Manipulation, Mason & Salisbury, 1985, "Stanford/JPL Hand", p. 79.

*Primary Examiner*—Michael Razavi
*Assistant Examiner*—Elizabeth L. Shopbell
*Attorney, Agent, or Firm*—Walter A. Hackler

[57] ABSTRACT

Apparatus for direct measurement of torque in an articulated joint includes a driver assembly, and a driven assembly. The driver and driven assembly are mounted on a common shaft allowing angular displacement between the driver and driven assemblies. A resilient driver is provided for rotating the driven assembly relative to the driver assembly and a sensor is provided for directly measuring torque as indicated by the angular displacement of the resilient driver relative to the driven assembly. A second sensor may be provided to measure the angular position of the driven assembly relative to the driver assembly.

17 Claims, 4 Drawing Sheets

MANIPULATOR INTEGRAL FORCE SENSOR

TECHNICAL FIELD

The present invention relates to articulated joints for use with manipulators, robots, and other devices, where it is advantageous to measure torque directly at an articulated joint. More particularly, this invention relates to integral sensors for a manipulator where both torque and angular position may be directly measured at the joint.

BACKGROUND ART

Programed robots, master-slave manipulators, telemanipulators, and material handling devices in general have a need to measure force in articulated joints so that force and position control may be accurately exercised. For gripping devices, maximum gripping forces may be varied according to the nature of the object being grasped. In assembly operations involving a wide range of variables, adaptive control is dependent upon force and position feedback information. Where unplanned contact with an object is a risk, force feedback can be used to initiate corrective action and to prevent damage to the manipulator and/or to the object being grasped.

Particularly where there are size constraints, various indirect means are now used to measure torque in an articulated joint, such as: resilient elements in motor drive shafts; measurement of actuator motor currents and other motor parameters; pressure sensors in drive mechanisms; and strain gages in structural members.

One example of a resilient element in the drive shaft of a rotary actuator is shown in U.S. Pat. No. 4,600,357 to Coules. This patent discloses a robot end effector with two opposing pivoted jaws. A helical gear assembly connects these jaws to a single rotary drive motor with a resilient element incorporated into the drive shaft.

Rotary position sensors are incorporated into the drive shaft before and after the resilient element. The difference between the rotary position sensors provides an indication of the torque being transmitted. The position sensor located after the resilient element also provides an indication of the position of the grasping jaws.

U.S. Pat. No. 4,727,996 to Fenn et al. discloses a gripping mechanism where the actuator motor current is sensed as an indirect indication of the gripping forces. When an electric motor is used, a braking mechanism is required to hold a particular position. Only a dynamic reading is provided. As changing ambient conditions can effect the torque force, critical information is not available when the motor is in a locked position.

An electric stepper motor may be used to provide a holding force without requiring additional braking means. U.S. Pat. No. 4,535,405 to Hill et al. discloses a means to measure torque using the difference between actual motor shaft position and theoretical shaft position based upon the desired position of the joint being controlled. Actual motor shaft position is determined by a rotary position sensor at the motor. The theoretical motor shaft position is determined by a rotary position sensor at the joint axis. The reading of theoretical motor shaft position is correlated to a motor shaft position under a no load condition. Angular deviations of the motor shaft and the maximum force are limited. As motor shaft angular deviations increase, they reach a point where the stepper motor slips to the next rotor hold position.

U.S. Pat. No. 4,666,361 to Kitabatake et al. discloses the use of pressure sensors to indirectly measure torque. A rotary motor is used to drive a worm wheel assembly which is connected to an arm joint by means of a drive belt. Pressure sensor assemblies are located at opposite ends of the worm gear. An indication of the torque at the arm joint is provided by measuring the axial force present in the worm gear. The direction of the torque in the arm pivot is indicated by the active pressure sensor.

Strain gages for indirect torque measurement are used in advanced hand-like grasping devices with multiple and closely spaced joints. The Standford/JPL hand-like robot end effector has three fingers, each having three joints. (International Encyclopedia of Robots. R. Dorf, Editor. 1988, page 627). Drive motor actuating forces are transmitted by cables in flexible conduits from the drive motors located beyond the end effector wrist. An indication of torque at each joint is provided by a means to measure tension in the cables by strain gages incorporated in the cable guiding structure. The drive motors have rotary position sensors on their shafts to provide an indication of the angular position of the joint.

The Utah/MIT hand-like robot end effector has four fingers, including an opposing thumb. (International Encyclopedia of Robots, R. Dorf Editor, 1988, page 627–628). In this design, each finger has four joints. Each joint is actuated by a pair of tendons connected to a pair of pneumatic cylinders located beyond the end effector wrist. Strain gages are incorporated into the guiding structure routing each tendon to provide an indication of the torque at each joint. Position sensing is provided directly at each joint by a Hall effect sensor.

In all of the above examples, the sensors which do not read directly at the joint axis are subject to errors introduced by friction and tolerance variations among interrelated components.

The present invention provides a novel way to provide angular position and torque information in an articulated joint wherein both sensors are integrated into the joint, improving accuracy and providing a more compact assembly. The mechanism is simplified, providing cost and reliability advantages which are not made obvious by the known prior art.

DISCLOSURE OF THE INVENTION

This invention provides a compact means to make direct torque measurements in articulated joints used in manipulators, robots, and other devices.

This invention may also be configured to provide a means for direct measurement of the angular position of each joint. The compact design of this invention is particularly suitable for use in relatively small and closely spaced joints often found in multiple finger end effectors.

The present invention is intended to function with any combination of actuator and power transmission means which may be used to cause angular displacement of an articulated joint.

This invention provides for an articulated joint with a driver assembly which provides an actuator means, a driven assembly, a drive collar, and a resilient means which are all positioned around a common shaft. The actuator means is linked to the drive collar so that bidirectional rotary motion can be imparted to the driver collar. The rotary motion, in turn, is imparted to the resilient element by the driver collar. The resilient means, in turn, imparts rotary motion to the driven assembly.

To the extent that there is resistance by the driven assembly to the rotary motion, the resilient means will distort and an angular displacement will be created between the driver collar and the driven assembly. Should an external torque be applied to the driven assembly, the resilient means will similarly distort.

A first sensor means, such as a rotary position sensor, is provided to measure this angular displacement between the driver collar and the driven assembly which is then converted to a measure of the torque present in the joint. A second sensor means, such as a rotary position sensor, may be provided to measure the angular displacement of the driven assembly relative to the driver assembly to provide an indication of the relative position of the driver assembly and the driven assembly. This measurement of relative position is independent of the measurement of torque.

The above mentioned and other features and objects of this invention and the manner of attaining them will be best understood by reference to the following descriptions of embodiments of the invention, when considered in conjunction with the accompanying drawings.

DETAILED DESCRIPTION OF THE INVENTION

The subject matter which I regard as my invention is particularly pointed out and distinctly claimed in the claims. The relative size of the components shown in FIG. 1 through FIG. 6 may vary depending upon the specifics of a given application. The selection of a specific embodiment of the invention will depend upon the objectives and requirements of a given application.

Figure 1:
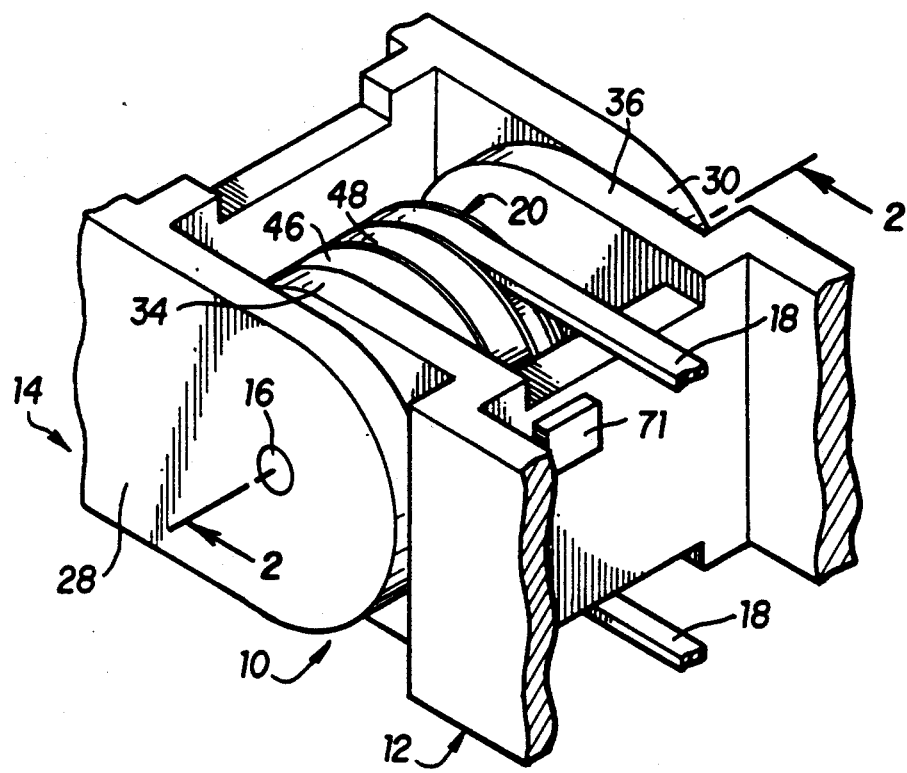
FIG. 1 is a simplified perspective view of an articulated joint of this invention.

FIG. 1 shows an articulated joint 10 comprising a driver assembly 12 and a driven assembly 14. The driver assembly 12 and driven assembly 14 move about a common shaft 16. The relative angular position of driven assembly 14 to driver assembly 12 is controlled by the movement of a drive belt 18. The movement of drive belt 18 is controlled by a remote actuator (not shown).

Any alternate power transmission means that can effect rotary motion may be substituted for the drive belt means shown in FIGS. 1, 2, 3, 4, 5 and 6.

Figure 2:
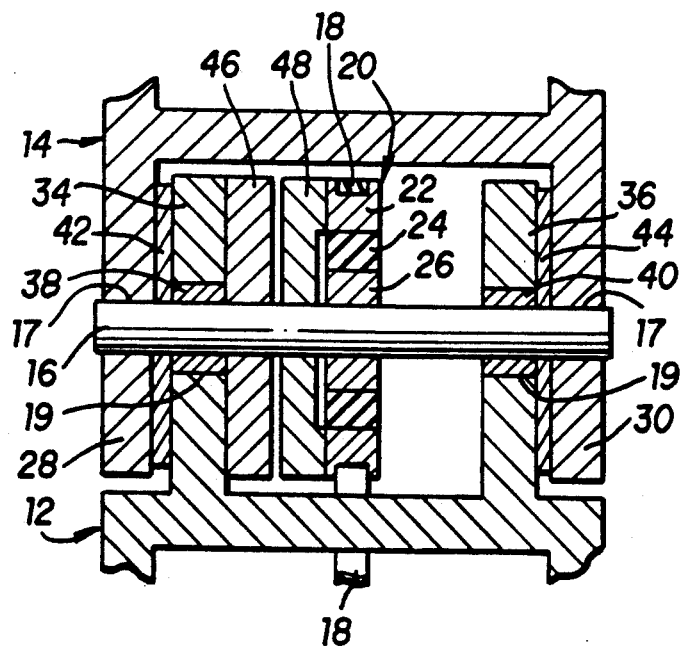
FIG. 2 is a sectional view of the articulated joint taken along lines 2—2 in FIG. 1.
Figure 3:
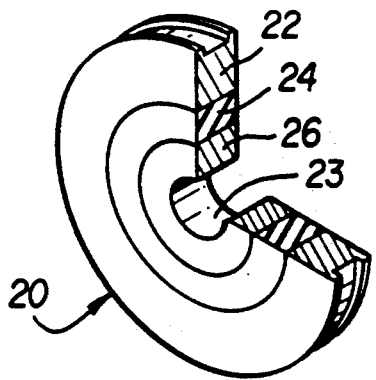
FIG. 3 is a perspective view of a section of the driver collar shown in FIGS. 1 and 2.

In one embodiment of this invention, the resilient means is incorporated into the driver collar. As shown in FIG. 2, driver collar 20 is concentric with common shaft 16. As also shown in FIG. 3, driver collar 20 is made up of three concentric rings; an outer ring 22 which engages drive belt 18, a middle resilient ring 24, and an inner ring 26. Bore 23 of inner ring 26 is secured to common shaft 16. Resilient ring 24 is not limited to the solid configuration shown in FIG. 3.

As shown in FIG. 2, driven assembly 14 includes two projecting hubs, hubs 28, 30. In this embodiment, common shaft 16 is secured in in-line bores 17 in hubs 28, 30 so that driven assembly 14 and common shaft 16 rotate together as one.

Driver assembly 12 includes two projecting hubs, hubs 34, 36. An in-line bore 19, passes through hubs 34, 36. In this embodiment, bearings 38, 40 are secured within in-line bore 19, and are sized to rotatably secure common shaft 16 within bearings 38, 40.

Thrust bearing 42 may be disposed between hub 28 in driven assembly 14 and hub 34 in driver assembly 12. Thrust bearing 44 may be disposed between hub 30 in driven assembly 14 and hub 36 in driver assembly 12. Thrust bearings 42, 44 are used to maintain a consistent axial position between driver assembly 12 and driven assembly 14 relative to common shaft 16.

Sensor 46 is concentric with common shaft 16, and is preferably a capacitance type, rotary position sensor. One of the active elements of sensor 46 is mounted on hub 34 of driver assembly 12, while the other active element is mounted on common shaft 16 which is secured to driven assembly 14. As is well known, each of the two active elements consists of a set of plates. The two sets of plates interleaf with the overlap area and hence capacitance value varying with changes in the relative angular position. Thus, sensor 46 measures the angular displacement of driven assembly 14 relative to driver assembly 12. Other types of sensors may be used to measure this angular displacement depending upon the specifics of a given application.

Sensor 48 is also preferably a capacitance type, rotary position sensor, and is configured for the measurement of relatively small angular displacements. One of the active elements of sensor 48 is mounted on outer ring 22 of driver collar 20 while the other active element is mounted on common shaft 16. Thus, sensor 48 measures the angular displacement between outer ring 22 and inner ring 26, which is secured to common shaft 16. This angular displacement is a measure of the torque in the joint as indicated by the angular displacement within the driver collar 20.

Other types of sensors may be used to measure this angular displacement within driver collar 20 between outer ring 22 and inner ring 26 with the selection depending upon the specifics of a given application. This includes the alternative to mount a sensor directly on the driver collar 20 to measure the angular displacement between outer ring 22 and inner ring 26.

Figure 4:
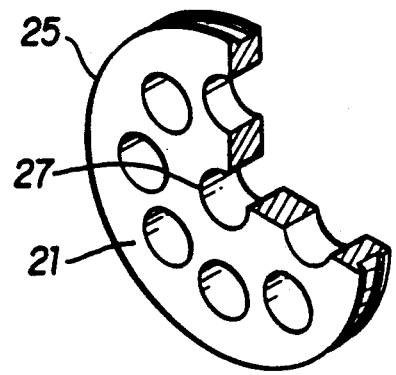
FIG. 4 is a perspective view of an alternate driver collar, which may be substituted for the driver collar shown in FIG. 3.

FIG. 4 is a perspective view of an alternate embodiment, driver collar 21, which may be directly substituted for driver collar 20 shown in FIG. 2 and FIG. 3. Driver collar 21 is made of resilient, homogeneous material, and a concentric ring of reduced cross section provides resiliency between the outer rim 25 and inner bore 27. This reduced cross section of driver collar 21 is functionally equivalent to resilient ring 24 of driver collar 20. The means to develop the reduced cross section of driver collar 21 is not limited to the ring of holes shown in FIG. 4.

Similar to driver collar 20, there is the alternative to mount a sensor directly on the driver collar 21 to measure the angular displacement between outer rim 25 and inner bore 27.

Figure 5:
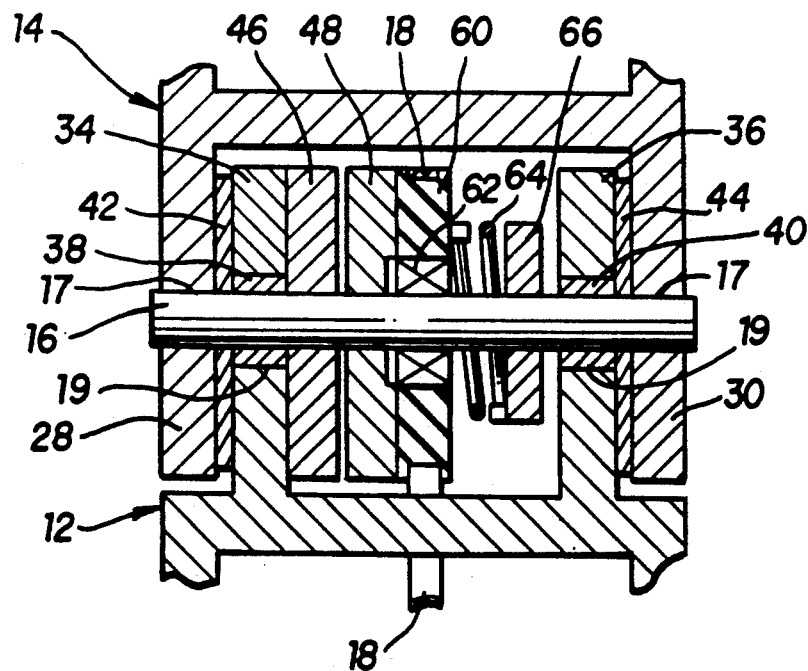
FIG. 5 is a simplified cross sectional view of the articulated joint taken along lines 2—2 in FIG. 1, showing an alternate embodiment of the driver collar, wherein a torsion spring in used.

FIG. 5 discloses an alternate embodiment of the resilient means shown in FIG. 2. FIG. 5 is similar to FIG. 2. The driver collar 20 has been replaced by driver collar 60. Driver collar 60 is concentric with common shaft 16, and is secured to ball bearing 62. Driver collar 60 engages drive belt 18, but the motion of drive belt 18 is not directly transmitted to common shaft 16, as rotational movement of driver collar 60 is displaced by ball bearing 62.

A torsion spring 64 is concentric with common shaft 16 and is connected at one end to driver collar 60 and at the other end to collar 66. Collar 66 is concentric with common shaft 16, and is secured to common shaft 16. Common shaft 16 continues to be secured to driven assembly 14 at in-line bore 17 of hubs 28, 30. Sensor 48 is concentric with common shaft 16, and is preferably configured to measure relative small angular displacements. One of the active elements of sensor 48 is mounted on driver collar 60, while the other active element is mounted on common shaft 16. Angular displacement of torsion spring 64 is measured by sensor 48 to provide a measure of the torque present in the articulated joint.

Torsion spring 64 may be replaced with a resilient disk, tube or other shape (not shown) which would be concentric with common shaft 16 and which would be secured at one end to driver collar 60 and at the other end to collar 66 in place of torsion spring 64.

Figure 6:
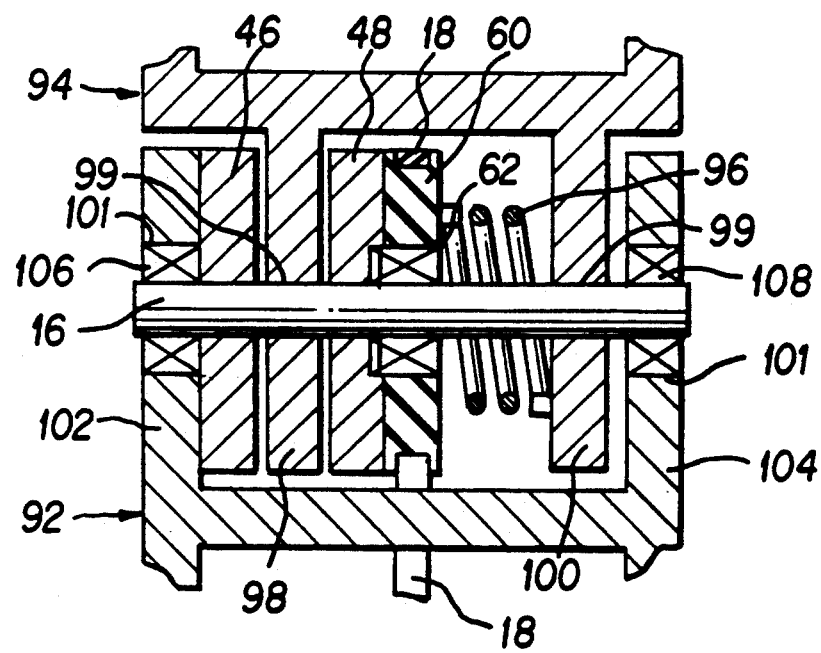
FIG. 6 is a simplified cross sectional view of the articulated joint taken along lines 2—2 in FIG. 1, showing an alternate embodiment of the driver collar wherein a torsion spring is used.

FIG. 6 discloses an further alternate embodiment of the resilient means. FIG. 6 is similar to FIG. 5 in that driver collar 20 has been replaced by driver collar 60. Driver collar 60 is again concentric with common shaft 16, and is secured to ball bearing 62 and torsion spring 96. The relative position of the hubs have been reversed. Driver assembly 92 now has its hubs 102, 104 external to hubs 98, 100 of driven assembly 94. Common shaft 16 is secured to in-line bore 101 in driver assembly 92 with bearings 106, 108 to rotatably secure common shaft 16 to driver assembly 92. This permits torsion spring 96 to be directly attached to hub 100 and eliminates collar 66 shown in FIG. 5.

As noted with torsion spring 64, torsion spring 96 may be replaced with a resilient disk, tube or other shape (not shown) which is concentric with common shaft 16 and which would be secured at one end to driver collar 60 and at the other end to hub 100 in place of torsion spring 96.

In this embodiment, common shaft 16 is secured in in-line bore 99 of two projecting hubs, hubs 98, 100 of driven assembly 94. Ball bearings 106, 108 are secured within in-line bore 101, which permits driver assembly 92 to be rotatably secured to common shaft 16.

Sensor 46 continues to measure the angular displacement of driven assembly 94 relative to driver assembly 92. One active element of sensor 46 is mounted on hub 102, while the other active element is mounted on common shaft 16. Sensor 48 continues to measure the angular displacement of the resilient element as a measure of torque present in the articulated joint. One active element of sensor 48 is mounted on common shaft 16, while the second active element is mounted on driver collar 60.

In FIG. 6 there is the alternative of mounting the active elements of sensor 46 on hub 98 and hub 102 to measure the angular displacement between driver assembly 92 and driven assembly 94. There is also the alternative of mounting the active elements of sensor 48 on hub 98 and on driver collar 60 to measure angular displacement of torsion spring 96.

Figure 7:
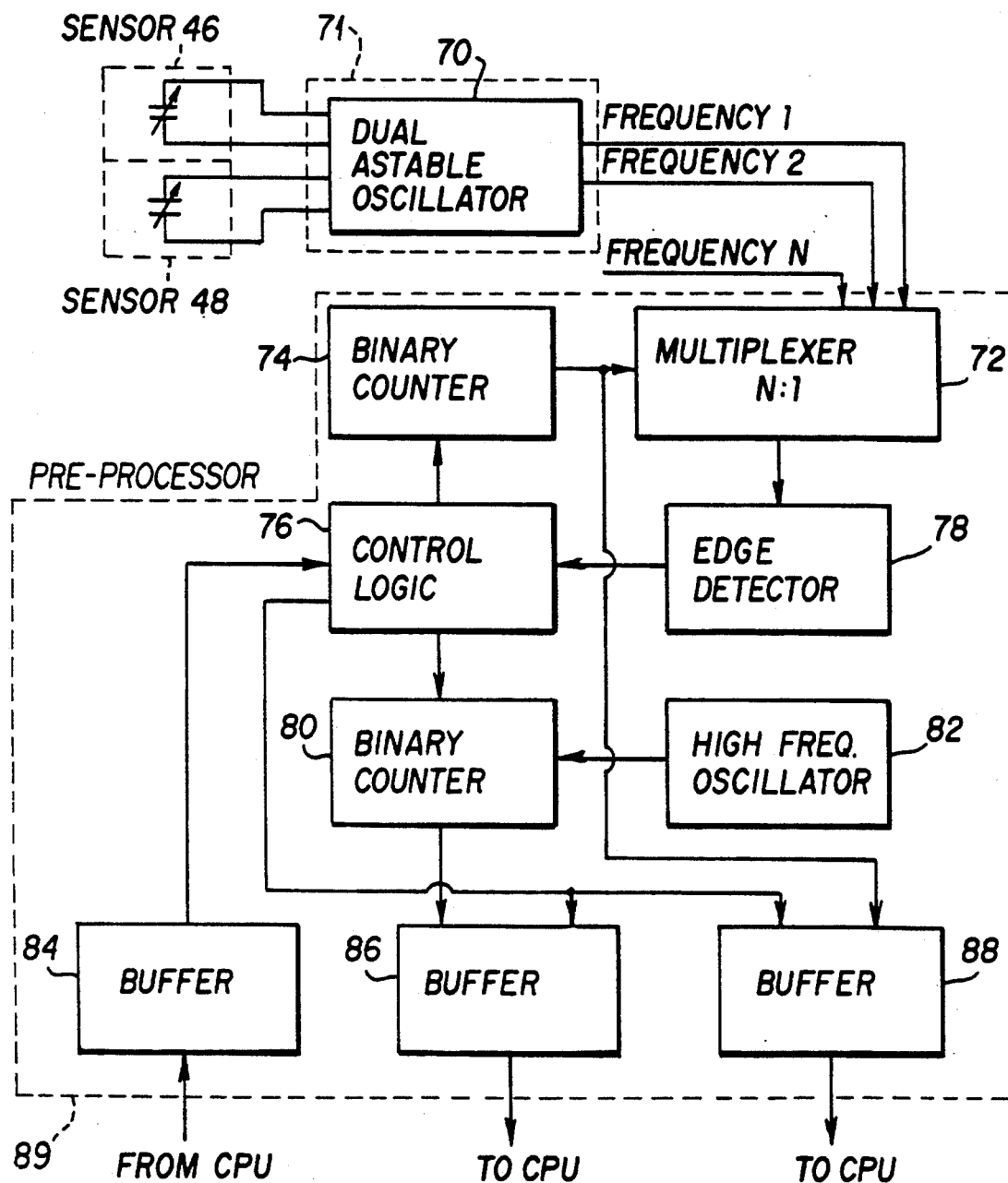
FIG. 7 is a simplified block diagram of one embodiment of the electronic interface between the rotary position sensors and the external electronic control system.

FIG. 7 shows a simplified block diagram for a sensor interface to an electronic control device, such as a computer. In the preferred embodiments, sensors 46, 48 are of the capacitance type rotary position sensors and provide variable input to a dual oscillator 70, such as Intesil ICM 7556, or two single oscillators such as Intesil ICM 7555. The oscillator 70 may be housed in enclosure 71, as shown in FIG. 1. Oscillator 70 is preferably located close to the sensors 46, 48 in order to minimize lead length and the degrading of the input signal at oscillator 70. The digital signal output of oscillator 70 is easier to transmit to the next stage of the electronics. The output of oscillator 70 preferably has its period rather than its frequency measured in order to minimize the time to complete a given measurement.

This same sensor interface may be used where the output of the sensors have varying resistance values. Were variable capacitance is shown as the input to the interface, the input may be reconfigured to accept variable resistance values. Potentiometer type angular position sensor examples include Vernitron Corporation, Vernitech part number 40421A and J. D. K. Controls, Incorporated, part number 6911-2030.

Multiplexer 72 is incremented by a binary counter 74 under control logic 76 to provide a selected input to edge detector 78. Binary counter 80 initiates a count of the output of high frequency oscillator 82 through control logic 76, to provide a measure of the period of the frequency of the selected input at edge detector 78.

Thus, high frequency oscillator 82 increases the count precision, while reducing CPU loading. Buffer 84 provides control commands from the computer to the control logic 76, while buffer 86 provides data to the computer. Buffer 88 also provides status and data identification to the computer.

As shown in FIG. 7: the multiplexer 72; binary counter 74; logic control 76; edge detector 78; binary counter 80; high frequency oscillator 82; and buffers 84, 86 and 88 may be incorporated into a pre-processor 89.

Where the minimum size of the sensor is important, technology is available for enhancing the values of variable capacitors of small size as noted in U.S. Pat. No. 3,949,280 to Odagiri et al. Where capacitance type rotary position sensors are described in the preferred embodiments, other types of sensors may be used along with their compatible electronic interfaces.

Driver collar 20, driver collar 21, and driver collar 60 are shown as they relate to a belt drive means. Depending upon the actuator and the force transmission means being used, these collar may be configured as a crank arm, pulley, gear, or other means concentric with common shaft 16 and capable of transmitting rotary motion.

OPERATION OF THE INVENTION

As shown in FIG. 1, drive belt 18 controls the motion of driven assembly 14 relative to driver assembly 12. Drive belt 18 engages driver collar 20. This belt and pulley combination is but one of many drive means that may be used to rotate the driver collar 20, in the application of this invention. This invention does not place any restrictions on the actuator selection or on the engagement means to bidirectionally rotate the driver collar.

The movement of drive belt 18 and the corresponding rotation of driver collar 20 does not directly cause a corresponding rotation of common shaft 16. See FIGS. 2 and 3. Driver collar 20 is an assembly of three concentric rings. Resilient ring 24 links outer ring 22 to inner ring 26. Inner ring 26 is secured to common shaft 16 which is secured to driven assembly 14 through hubs 28, 30. If no resistance is present, rotation of drive belt 18 will cause the rotation of driver collar 20, which will cause the same degree of rotation in common shaft 16 and driven assembly 14.

However, if driven assembly 14 meets resistance to its rotation, resilient ring 24 will develop a rotational displacement between the outer ring 22 and inner ring 26. The amount of this rotational displacement is a measure of the torque in the joint due to the resistance encountered by driven assembly 14. Sensor 48 is used to measure the degree of rotational displacement. In one embodiment, one of the active elements of sensor 48 is concentric with and assembled to outer ring 22, and the second active element is secured to common shaft 16, which in turn is secured to inner ring 26.

FIG. 4 shows an alternate embodiment of this invention. Driver collar 21 is a direct replacement for driver collar 20. Driver collar 21 is preferably made of a resilient, homogeneous material, wherein resiliency is developed by a concentric middle area of reduced cross section. As shown in FIG. 4, this reduced cross section is preferably developed by a concentric ring of through holes spaced 45 degrees apart. Other configurations may also be used to develop this reduced cross section.

FIG. 5 shows another alternate embodiment of this invention. Driver collar 20 is replaced by driver collar 60, which is rotatably secured to common shaft 16 by ball bearing 62. Any rotation of driver collar 60 is conveyed by torsion spring 64 to collar 66 which is locked to common shaft 16. Common shaft 16 is secured to driven assembly 14 and any resistance to the rotation of driven assembly 41 will cause an angular displacement of torsion spring 64. This displacement is measured by sensor 48 which has one element assembled to drive collar 60 and another element secured to common shaft 16.

Torsion spring 64 may be replaced with a resilient disk, tube or other shape (not shown) which is concentric with common shaft 16 and secured at one end to driver collar 60 and at the other end to collar 66.

FIG. 6 shows a further embodiment of this invention. Torsion spring 64 of FIG. 5 is replaced by torsion spring 96 and collar 66 is eliminated. Torsion spring 96 is attached to driver collar 60 and to hub 100 of driven assembly 94. Driven assembly 94 is secured to common shaft 16 at hub 98 and hub 100. Any rotation of driver collar 60 is conveyed by torsion spring 96 to hub 100. Any resistance to the rotation of driven assembly 94 will cause an angular displacement of torsion spring 96. This displacement is measured by sensor 48 which has one element assembled to driver collar 60 and the other element assembled to common shaft 16.

As with torsion spring 64, torsion spring 96 may be replaced with a resilient disk, tube or other form (not shown) which is concentric with common shaft 16 and which could be secured at one end to driver collar 60 and at the other end to hub 100.

The selection of the resilient means disclosed in these alternate embodiments is conditioned by the specifics of a given application. Ambient conditions, cost, space limitations, size, sensitivity, and torque range may all effect the final selection.

Sensor 48 is substantially the same, as shown in FIGS. 2, 5 and 6. Sensor 48 provides a reading of the angular displacement of the resilient element and hence the torque present in the articulated joint. While any type of sensor may be used, the capacitance type, rotary position sensor is preferred because it can be configured to measure relatively small angles of displacement. Further, the interface with control electronics is simplified as noted herein.

Sensor 46 is substantially the same as shown in FIGS. 2, 5 and 6. The sensor 46 provides a reading of the angular displacement of the driven assembly in relation to the driver assembly, and hence the relative position of these two assemblies. Any type of sensor 46 may be used, but the capacitance type, rotary position sensor 46 is preferred, as noted above.

FIG. 7 shows the electronic interface of sensor 46 and sensor 48. Their capacitance values are the variable input to dual oscillator 70, which may be similar to Intesil ICM 7556. As shown in FIG. 7, oscillator 70 may be located in enclosure 71 and is close to the sensors in order to reduce lead length and the degrading of the input signal. Also, the conversion to a digital signal output facilitates subsequent processing.

The two outputs of dual oscillator 70 each have a frequency that varies according to the changing capacitance of the respective sensors. Where multiple sensors are being monitored, the output frequencies may be routed through a multiplexer 72. The period of the selected frequency is measured with an edge detector 78, high frequency oscillator 82, and binary counter 80 under the control of control logic 76. Buffers 84, 86 and 88 facilitate the interface with a CPU or other control means.

Measuring period rather than frequency can provide for more frequent and accurate output signals, particularly when values are changing. The use of a binary counter as a preprocessor can reduce CPU loading.

Alternate sensor mounting configurations and alternate bearing configurations to those noted in the drawings and specifications are intended to be included within the scope of the claims.

Therefore, while this invention has been described with reference to particular embodiments, it is to be understood that modifications may be made without departing from the spirit of the invention, or from the scope of the following claims.

INDUSTRIAL APPLICABILITY

This invention is directed to an apparatus for direct measurement of torque and position of an articulated joint, as found in manipulators, robots and other devices.

I claim:

1. An apparatus for direct measurement of torque in an articulated joint, responsive to the movement of a remote actuator, which comprises:
   a) a driver assembly having driver hubs extending in spaced relation therefrom, said driver hubs having bores which define an axis of rotation of the articulated joint;
   b) a common shaft concentric with said axis of rotation and passing through said bores of the driver assembly hubs, said common shaft being secured to said driven assembly and rotatably secured in bearings to the driver assembly;

c) a driven assembly having driven hubs extending in spaced relation therefrom; said driven hubs having bores which are concentric with the axis of rotation of the articulated joint and through which the common shaft passes;

d) a driver collar which is concentric with the common shaft and responsive to movement of the remote actuator;

e) a resilient means for imparting rotary motion from the driver collar to the driven assembly; and f) a first sensor which measures angular displacement of the driver collar relative to the driven assembly to provide a direct measurement of the torque on the articulated joint.

2. The apparatus of claim 1, wherein a second sensor measures the angular displacement of the driven assembly relative to the driver assembly for monitoring the relative position of the articulated joint.

3. The apparatus of claim 1, wherein the resilient means is integrated into the driver collar, and comprises an inner portion concentric with and secured to the common shaft; a middle resilient portion secured to the inner portion; an outer portion secured to the middle resilient portion, and wherein the outer portion is responsive to movement of the remote actuator.

4. The apparatus of claim 3, wherein the middle resilient portion is developed by a reduced cross section middle portion in a drive collar made of a homogeneous resilient material.

5. The apparatus of claim 4, wherein the reduced cross section of the middle portion is formed by a plurality of holes disposed in the middle portions of the driver collar.

6. The apparatus of claim 3, wherein the first sensor is positioned to measure the relative rotational displacement between the driver collar outer portion relative to the driven assembly to provide a direct measurement of the torque in the articulated joint.

7. The apparatus of claim 1, wherein the resilient means is concentric with the common shaft and has one end secured to the driver collar and the other end secured to the common shaft, and the driver collar is rotatably secured to the common shaft.

8. The apparatus of claim 7, wherein the resilient means is a torsion spring.

9. The apparatus of claim 1, wherein the resilient means is concentric with the common shaft and one end of the resilient means is secured to the driver collar and the other end is secured to the driven assembly.

10. An apparatus for direct measurement of the torque is an articulated joint, responsive to movement of a remote actuator, which comprises:

a) a driver assembly with driver hubs extending in spaced relation therefrom, said hubs having bores which define an axis of rotation of the articulated joint;

b) a common shaft concentric with the axis of rotation and passing through the bores of the driver hubs;

c) a driven assembly with driven hubs extending in spaced relation therefrom; said driven hubs having bores which are concentric with the axis of rotation and through which the common shaft passes;

d) a resilient driver collar concentric with the common shaft and responsive to movement of the remote actuator, with means for imparting rotary motion to the driven assembly; and e) a first sensor responsive to movement of the driver collar relative to the driven assembly, for monitoring the torque on the articulated joint.

11. The apparatus of claim 10, wherein a second sensor is responsive to movement of the driven assembly relative to the driver assembly for monitoring the relative position of the articulated joint.

12. The apparatus of claim 10, wherein the resilient driver collar is an assembly with a resilient component disposed on the common shaft for imparting rotary motion of the driver collar to the driven assembly.

13. The apparatus of claim 12, wherein the resilient element is a torsion spring.

14. The apparatus of claim 10, wherein the common shaft is secured to the bores of the driven assembly and the common shaft is rotatably secured in bearings mounted in the bores of the driver assembly.

15. The apparatus of claim 14, wherein the resilient driver collar comprises an inner portion concentric with and secured to the common shaft; a middle resilient portion secured to the inner portion; an outer portion secured to the middle resilient portion, and wherein the outer portion is responsive to movement of the remote actuator.

16. The apparatus of claim 14, wherein the resilient driver collar comprises an inner portion concentric with and secured to the common shaft; a reduced cross section middle portion; and an outer portion secured to the middle portion, and wherein the outer portion is responsive to movement of the remote actuator.

17. The apparatus of claim 16, wherein the reduced cross section of the middle portion is formed by a plurality of holes disposed in the middle portion of the driver collar.

* * * * *